Patented May 1, 1923.

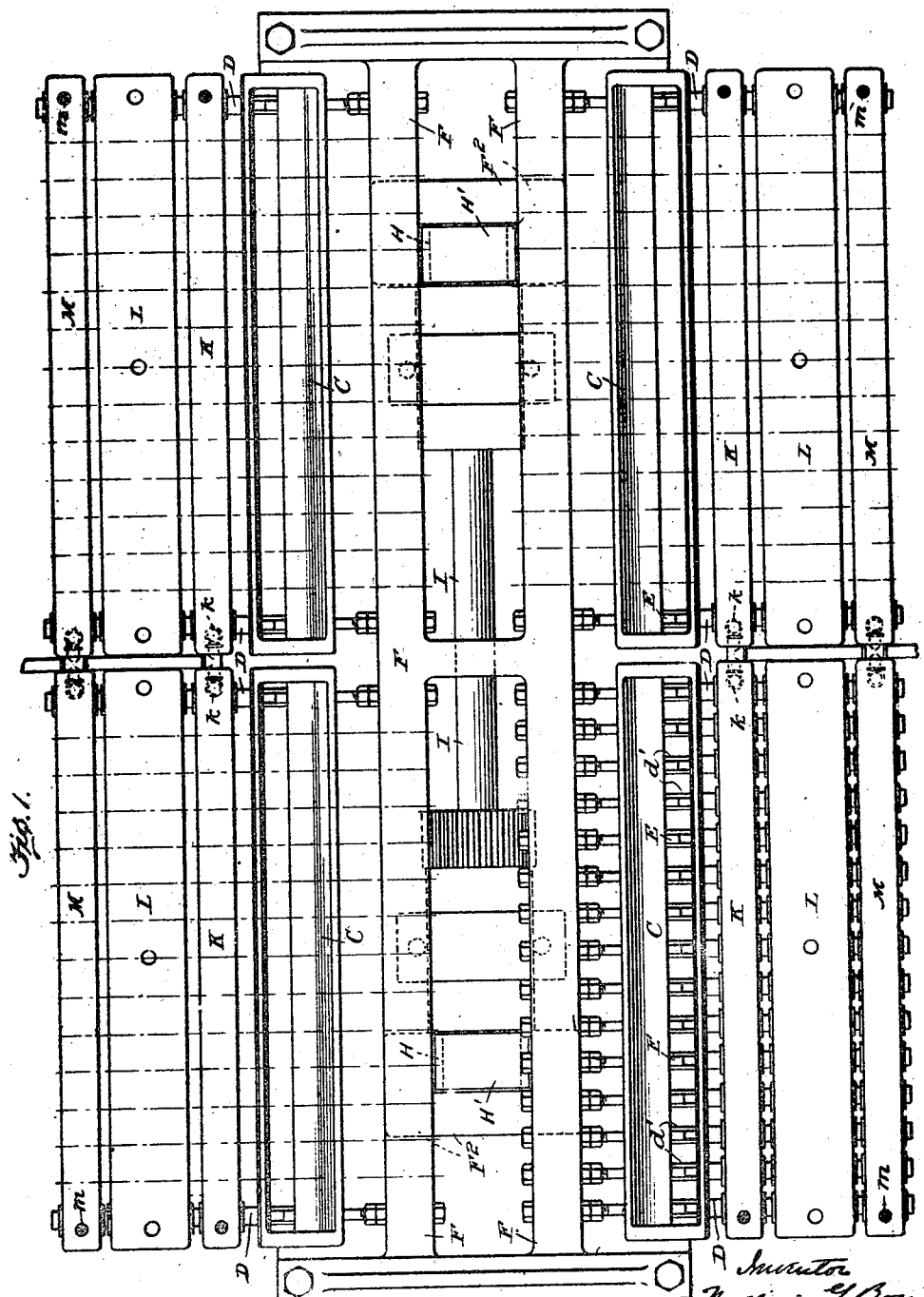

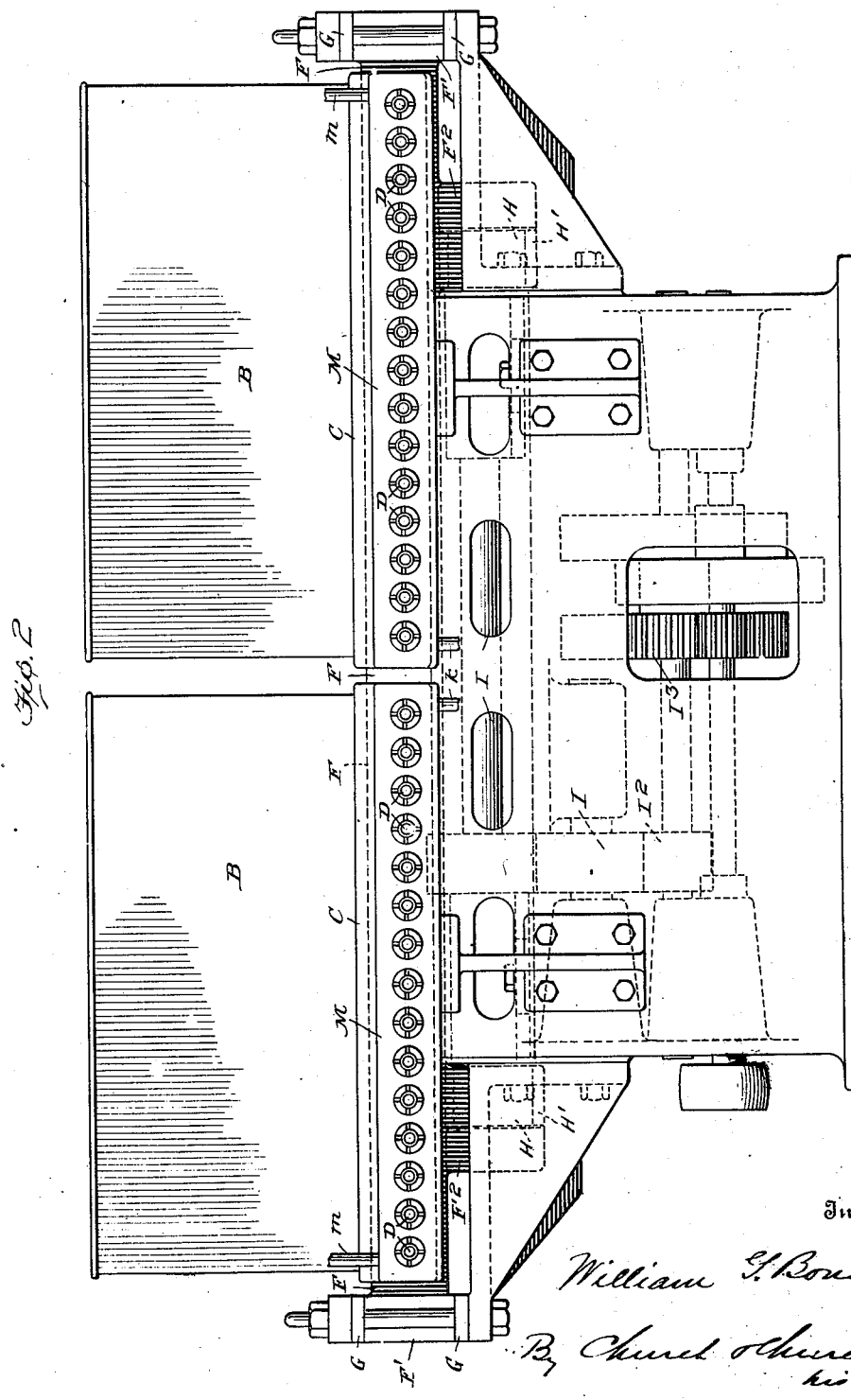

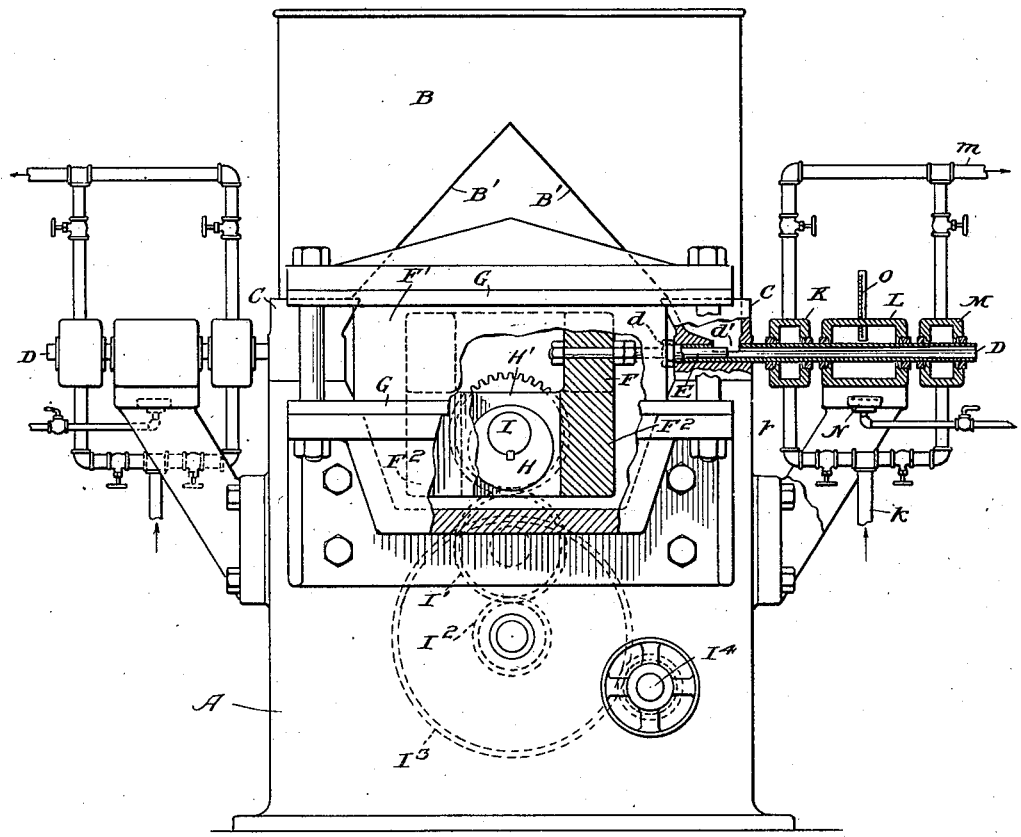

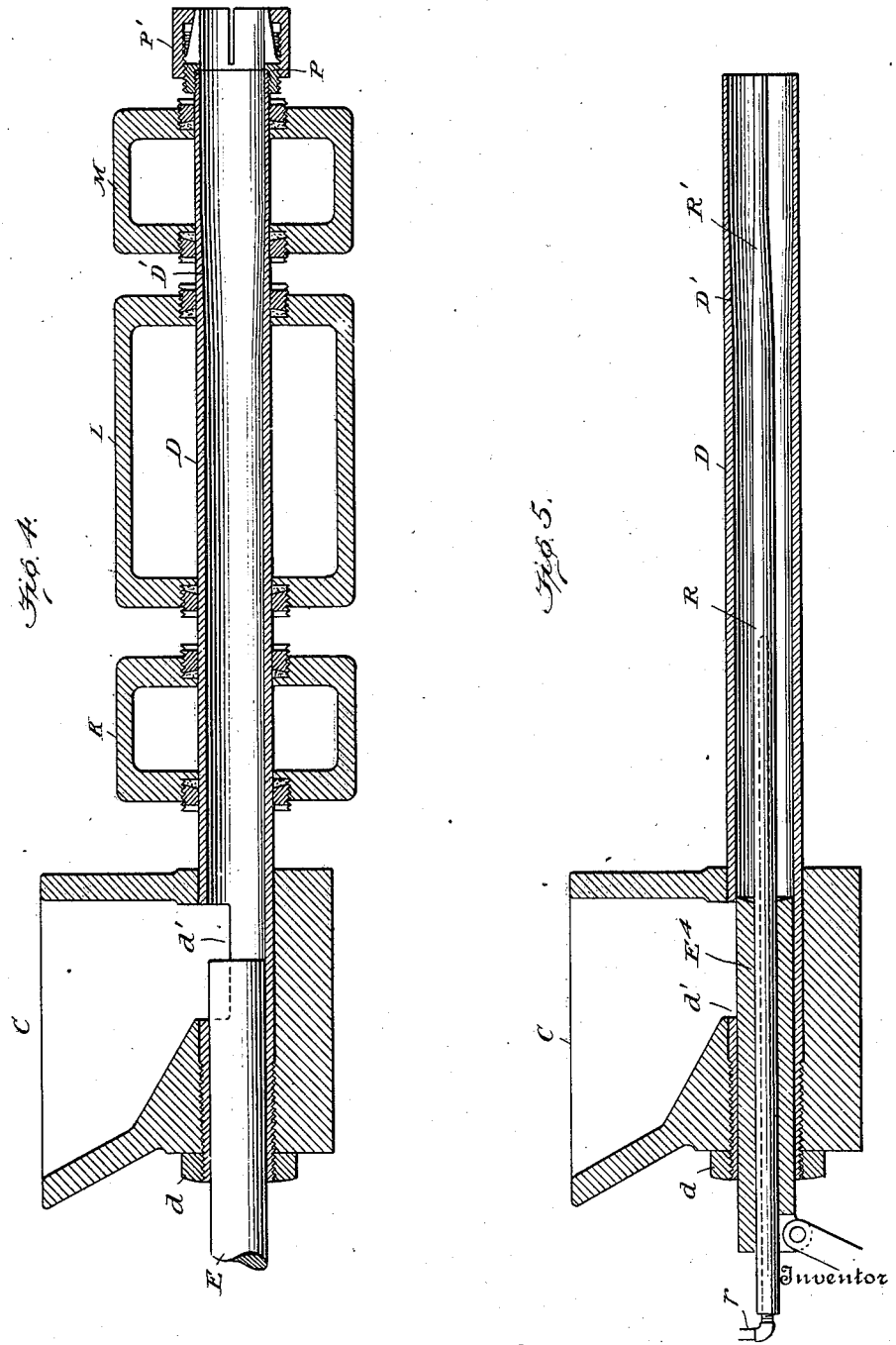

1,453,617

UNITED STATES PATENT OFFICE.

WILLIAM G. BOND, OF WILMINGTON, DELAWARE, ASSIGNOR TO BOND MANUFACTURING CORPORATION, OF WILMINGTON, DELAWARE, A CORPORATION OF DELAWARE.

PROCESS OF AND APPARATUS FOR MANUFACTURING ARTICLES OF COMMINUTED CORK.

Application filed February 14, 1921. Serial No. 444,927.

*To all whom it may concern:*

Be it known that I, WILLIAM G. BOND, a citizen of the United States, residing at Wilmington, in the county of New Castle and State of Delaware, have invented a certain new and useful Process of and Apparatus for Manufacturing Articles of Comminuted Cork; and I do hereby declare the following to be a full, clear, and exact description of the same, reference being had to the accompanying drawings, forming part of this specification.

This invention relates to the art of manufacturing comminuted cork articles, such as bottle sealing disks, gaskets, rods, gun wads, etc., objects of the invention being to provide an improved process of and apparatus for uniting the particles of cork by the coagulation of the binding agent and for giving the united material a preliminary contour or cross sectional formation corresponding to that of the final article. Other objects of the invention are to provide a continuous process which may be utilized to increase production with minimum labor and to reduce the number of operations necessary in the production of a given output.

Generally speaking, the invention contemplates the utilization of comminuted cork, the particles of which have incorporated therewith a suitable binder and other elements which are known and have heretofore been used for imparting to the cork the desired flexibility or resiliency and which binder has the capacity of coagulating and uniting the particles of cork when subjected to a proper degree of heat and pressure and when cool becoming both insoluble and practically unaffected by any degree of heat to which the finished article may be subjected without being destroyed or consumed.

The comminuted cork prepared as above is in the present process forced into and through a confining tube or chamber wherein it is subjected to variations in temperature and confining pressure during its forward travel and whereby the particles of cork are first compacted before any effective rise in temperature, then while confined subjected to an elevated temperature sufficient to effect coagulation of the binder and then, while still under restraint, allowed to expand to the desired predetermined dimension, the temperature being reduced during or immediately after such expansion and while the moving column or rod is continuing its forward progress. In the preferred development of the process the cork particles are added in succeeding increments to the body passing into and through the treating chamber or tube and are advanced by an intermittently acting or reciprocatory plunger whereby the particles are alternately compressed and allowed to expand and adjust themselves to each other in reaching their final relative positions producing a general arrangement of particles which is advantageous in the product.

In carrying the process into practice, it is preferred to employ a multiplicity of treating tubes or chambers fed from a common hopper. The plungers or feeding mechanism and heating and cooling means are operated or controlled simultaneously and to secure additional economy and increased output the apparatus is made double-acting, the feed taking place alternately in opposite directions.

A preferred machine with which the process is practiced is illustrated in the accompanying drawings, in which:

Figure 1 is a top plan view.

Fig. 2 is a side elevation.

Fig. 3 is an end elevation partly in section.

Fig. 4 is a sectional elevation on an enlarged scale, through one treating tube or chamber.

Fig. 5 is a section showing a modified form of chamber for making gaskets.

The machine illustrated in the accompanying drawings is one designed to have a large output through the duplication of treating chambers and feeding mechanism and is adopted for illustrative purposes, inasmuch as it represents a commercial development now in use. In this machine there is provided a hopper for the reception of the comminuted cork which has been previously impregnated with the binder material hereinbefore referred to, and this hopper is adapted to supply the comminuted cork to a multiplicity of feeding and treating mechanisms each of which may be a duplicate of the other and each deliver its own complete product. Hence, except for the reference to general characteristics of the machine, the description of one feeding and treating mechanism will be sufficient.

Referring to the drawings, the reference letter A indicates a substantial base or main frame, and B a hopper superposed above the main frame and preferably, for convenience in construction divided into sections. Each section is adapted to supply comminuted cork to two series of feeding and treating devices which are arranged opposite to each other. For this purpose the hopper is formed with intermediate downwardly converging walls indicated at B′, thereby forming throats which communicate with elongated hopper bottoms C. The hopper bottoms C are preferably in the form of long castings through which a series of tube or chamber openings are formed to intersect the channel leading from the hopper and each opening is adapted for the reception of or to form a part of a treating tube or chamber D through which the comminuted cork is extruded.

The feeding mechanism embodies a plunger E adapted to reciprocate in each tube or chamber D and all of the plungers are adjustably connected at their inner ends with a reciprocatory frame F. The adjustable connection is conveniently formed so that each plunger may be individually adjusted to thereby vary the feed of cork for each particular tube or chamber. The adjustment is effected through the medium of lock nuts mounted on the plungers on each side of the bars of the frame F. The frame F, which is of necessity a heavy and exceedingly rigid structure, is preferably formed with cross heads F′ adapted to slide in rigid guideways G at each end of the machine, and it is reciprocated so as to impart longitudinal movement to the plungers, by means of eccentrics H mounted on a shaft I journaled in suitable bearings in the main frame, said eccentrics in turn work in sliding blocks H′ confined between ways formed by the downward extensions F² of the frame F. Rotary motion is imparted to the shaft I through the medium of gearing indicated at I′, I², I³, from a drive shaft I⁴, to which a motor or prime mover may be connected in any suitable way.

The series of treating tubes or chambers are provided with means whereby their temperature conditions may be accurately regulated in transverse zones and also are so formed as that certain pressure conditions may be established therein to effect the treatment of the cork during its passage therethrough. As a convenient and preferred arrangement, the tubes are surrounded at certain points in their length, first, by a chamber to which a cooling medium may be supplied, then by a chamber to which heating medium may be applied, and, finally, by a chamber to which cooling medium may be applied so that the cork in passing through the tube may be subjected to pressure and particle adjusting conditions without having its temperature raised, or, if need be, during a time when its temperature will be actually lowered, and in passing from this zone of operation, it will pass into a zone wherein it will be subjected to an elevated temperature which is hot enough to affect the binding material in the well known way, and during this period it is held under compression both transversely and longitudinally and the period of heating is preferably maintained long enough to properly affect the binding material clear to the center of the column of cork. In passing from the heating zone, the column of cork is still held under restraint, but is allowed to expand slightly, both transversely and longitudinally of the tube, its temperature being reduced or brought back to normal while still held under restraint, whereby it acquires a permanent set as to dimension.

Referring particularly to Figs. 3 and 4, it will be seen that each treating chamber is preferably formed by a tube D, the inner end of which is threaded for co-operation with the wall of the hopper base C, and for the reception of a lock or retaining nut $d$ a transverse opening or cut in the wall of the tube at $d'$ permits the comminuted cork to drop into the same in front of the plunger when the latter is withdrawn and the cork entering the tube is advanced by the forward movement of the plunger in the direction in which it will be ultimately ejected. Surrounding the tubes adjacent the hoppers is a cold water chamber or jacket K and beyond the cold water jacket or chamber there is a hot oil chamber or jacket L, preferably of greater width than the cold water jacket, inasmuch as the heating period should be somewhat prolonged in order to effect complete treatment into the center of the cork column and beyond the heating chamber there is a cooling chamber M which may substantially correspond to the chamber K before referred to. At a suitable point, preferably intermediate the heating and final cooling chambers, the diameter of the bore of the tube is slightly increased, as shown at D′ and the increased diameter is maintained during the time the column of cork is passing through the final cooling chamber.

As a convenient means for supplying cooling medium and heat, the chambers K and M may be provided with water inlet and outlet pipes $k$ and $m$ having suitable valves therein, whereby the quantity of circulating medium supplied may be regulated and the temperature thus maintained at the point desired. The heating chamber may be conveniently filled with oil, and heat supplied thereto, for example, by a series of burners N any one or more of which may be shut off or the size of the flame adjusted to bring the heating chamber up to the desired temperature, and this temperature may be conveniently noted from a thermometer indicated at L.

Under certain conditions it may be desirable to interpose some resistance to the discharge of the treated and cooled column of cork so as to maintain a greater longitudinal pressure in the discharge end of the treating tube or chamber and, hence, provision is preferably made whereby either the end of the tube may be contracted slightly when desired, or by the mounting of a split discharge end P (Fig. 4), in position for the column of cork to pass therethrough. The diameter of the split discharge end may be conveniently regulated by forming its exterior of cone-shape and applying a clamping nut or ring P' thereto in such wise that it may be adjusted in or out so as to vary the size of the opening and consequently impose a greater or less frictional resistance on the movement of the column or rod of cork.

Where it is desirable to form a central opening or openings in the column or rod of cork, as, for example, in the formation of gaskets or other articles having apertures therein, this can be conveniently accomplished, as shown, for example, in Fig. 5, wherein it will be seen that the treating tube or chamber is provided with a central core R, having its forward end reduced in diameter at R' to correspond to the enlarged diameter of the chamber or tube itself. At its rear end the said core or mandrel R passes through the plunger E⁴, and, as shown, it communicates with a pipe r through which cooling medium may be supplied to the core or mandrel R so as to prevent the transference of heat back into the column of cork by conduction in the mandrel itself. By thus cooling the mandrel or core, the temperature conditions may be maintained as hereinbefore described, and the operation of the parts will in all instances correspond.

In operation, the comminuted cork dropping down in front of the plunger will be advanced by the latter into contact with previously advanced cork which is passing through the tube or treating chamber, or, if no cork be in the chamber, the desired condition of pressure, etc., may be initially brought about by plugging the outer end of the chamber until the chamber is filled, when the plug will be driven out by the accumulated cork. Inasmuch as the plunger reciprocates the action on the comminuted cork initially is to alternately compress and release the same, and the result of this action is that the particles of cork are permitted to adjust themselves one to the other, and naturally assume a relative arrangement in which the largest or greatest diameters will be transversely of the direction of movement of the column, and in the completed column they will assume a more or less flake-like formation.

By the time the cork is advanced through the first cooling zone and before its temperature has been raised appreciably or sufficiently to affect the binding agent, the pressure both longitudinally and transversely will approach the maximum, although it is believed that the maximum pressure is and should be found at a point just within the zone where the heating effect is becoming apparent and this pressure will be substantially maintained through the heating zone or until the binder through the entire cross section of the moving column or rod has been properly affected by the heat so as to coagulate and become insoluble and bind the particles firmly together when the temperature is again reduced. This reduction in temperature should be properly accompanied by a slight relaxation in the pressure or compression of the cork, but at the same time sufficient restraint must be maintained during the cooling to prevent any rupture of the particles of cork themselves or the tearing of the particles apart by any vapors which may have been generated or heated air confined within the column or rod and, therefore, the final cooling zone is arranged to surround the portion of the tube which is of slightly larger diameter and the temperature conditions in this zone are so regulated that the rod or column of cork as it issues from the tube will be at a sufficiently reduced temperature to permanently maintain its form.

In the practical operation of the process the rod not only expands transversely, but it also expands longitudinally, and as an illustration of the latter expansion, it may be noted that, should the feeding mechanism be arrested in its movement, the column of cork will continue to extrude from the discharge end of the tube for a considerable period, and the indications are that there is a neutral point in the tube where the feeding of additional cork does not further condense the product, this neutral point representing a zone of maximum density, and it is during this period of maximum density that the heat treatment should be made effective.

The extruded rod or column of cork is severed into sections of the desired length or thickness to form bottle sealing disks, gaskets, packing rings, gun wads, etc., and in many uses to which such articles are put, no further coating or treatment is necessary, but, if desired, the rod before being severed or the severed sections may be coated or treated in the well known or any preferred way to give increased water or gas resistant or lubricating qualities. In my prior Patent No. 1,358,279, November 9, 1920, I have disclosed a gun wad which may be, and preferably is, produced by the process and with the apparatus set forth herein.

What is claimed is:

1. The process of forming articles of comminuted cork, the particles of which are united by a binder which becomes effective under the influence of heat and pressure to unite the cork particles and without destroying the resiliency of the cork, which process consists in forcing loose uncompressed comminuted cork and a small percentage of binder into and through a confining tube whereby it is confined and compressed within the tube during its passage therethrough, and in forming heating and cooling zones in said tube through which the compressed and confined cork passes successively while subjected to confining and compressing pressure.

2. The process of forming articles of comminuted cork the particles of which are united by a binder which becomes effective under the influence of heat and pressure to unite the cork particles, which process consists in heating and forcing the comminuted cork and binder through a confining chamber or tube and in preliminarily subjecting the particles to alternate compression and release of compression during their movement into the chamber, whereby the particles are caused to adjust themselves to each other in assuming their final relative positions.

3. The process of forming articles of comminuted cork the particles of which are united by a binder which becomes effective under the influence of heat and pressure to unite the cork particles, which process consists in forcing the loose and uncompressed prepared cork and binder into a confining chamber or tube without raising its temperature and in which its movement is resisted and compression effected by friction against the confining walls, creating a heating zone through which the compressed cork passes while confined in the chamber, and in cooling the cork while confined and in movement beyond the heating zone.

4. The process of extruding cork, which consists in forcing comminuted cork and binder through a confining tube or die by successively applied impulses and increment additions, and in creating a transverse zone of high temperature intermediate the entrance and exit ends of the tube or die.

5. The process of extruding cork which consists in forcing comminuted cork and binder through a confining tube or die by successively applied impulses and added increments of cork, creating a transverse zone of high temperature intermediate the entrance and exit ends of the tube or die and in restraining the free expansion of the cork during subsequent cooling.

6. The process of extruding cork which consists in forcing comminuted cork and binder through a confining tube or die by supplying cork to the entrance end and applying pressure thereto, and in maintaining the cork at a low temperature until compressed in the tube or die, then advancing the same through a heated zone and finally reducing the temperature while holding the cork under restraint to prevent deformation or injury due to the internal heated air or vapor.

7. The process of extruding cork which consists in forcing comminuted cork and binder through a confining tube or die by supplying cork to the entrance end and applying pressure thereto, and in forming end zones of reduced temperature and an intermediate zone of high temperature in said tube or die, whereby the comminuted cork is first compressed without material increase in temperature, then while compressed subjected to heat, and finally its temperature is reduced while still under restraint to prevent rupture or distortion during the cooling stage.

8. In an apparatus for extruding cork, the combination of means for feeding comminuted cork, a tube or die through which the cork is forced by the feeding mechanism, and means for creating preliminary and final cooling zones and an intermediate heating zone in said tube or die.

9. In an apparatus for extruding cork, the combination of means for feeding comminuted cork, a tube or die through which the cork is forced by the feeding mechanism, said tube or die being of increased diameter toward its discharge end, means for creating a heating zone around the portion of the tube of lesser diameter, and means for creating a cooling zone around the portion of the tube of larger diameter.

10. In an apparatus for extruding cork, the combination of means for feeding comminuted cork, a tube or die through which the cork is forced by the feeding mechanism, said tube or die having an internal diameter which increases toward the discharge end, a cooling chamber surrounding the portion of the tube of larger diameter, a heating chamber surrounding the intermediate portion of the tube of smaller diameter, and a cooling chamber surrounding the tube intermediate the heating chamber and feeding mechanism.

11. In an apparatus for extruding cork, the combination with a tube or die having a diameter in proximity to its discharge end which is greater than the diameter in proximity to its entrance end and a reciprocatory plunger working into and out of the entrance end for feeding comminuted cork into and through the tube, of means for creating a heating zone in the tube in the area of smaller diameter and means for creating a cooling zone in the tube in the area of larger diameter.

12. A tube or die for cork extrusion apparatus formed with a substantially uniform major diameter toward the discharge end and a substantially uniform minor diameter toward the entrance end and the internal wall gradually merging from the minor into the major diameter in combination with means for heating the tube or die in the area of smaller diameter and cooling the same in the area of larger diameter.

WILLIAM G. BOND.